US012524200B2

(12) United States Patent
Rehman

(10) Patent No.: US 12,524,200 B2
(45) Date of Patent: Jan. 13, 2026

(54) MUSIC PROCESSING FOR VEHICLE MAPS

(71) Applicant: Toyota Motor North America, Inc., Plano, TX (US)

(72) Inventor: Umer A. Rehman, Plano, TX (US)

(73) Assignees: TOYOTA MOTOR NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 94 days.

(21) Appl. No.: 18/402,176

(22) Filed: Jan. 2, 2024

(65) Prior Publication Data
US 2025/0217102 A1 Jul. 3, 2025

(51) Int. Cl.
*G01C 21/36* (2006.01)
*G06F 3/16* (2006.01)

(52) U.S. Cl.
CPC ......... *G06F 3/167* (2013.01); *G01C 21/3667* (2013.01)

(58) Field of Classification Search
None
See application file for complete search history.

(56) References Cited

U.S. PATENT DOCUMENTS

| | | | |
|---|---|---|---|
| 8,370,747 B2 | 2/2013 | Foxenland | |
| 2004/0006425 A1* | 1/2004 | Wood | G01C 21/26 701/532 |
| 2009/0228799 A1* | 9/2009 | Verbeeck | G10H 1/0008 704/235 |
| 2009/0307594 A1 | 12/2009 | Kosonen et al. | |
| 2010/0216491 A1* | 8/2010 | Winkler | G06Q 50/60 455/457 |
| 2016/0035323 A1* | 2/2016 | Na | G06F 3/04883 345/589 |
| 2018/0047372 A1* | 2/2018 | Scallie | G06F 3/04815 |
| 2018/0088900 A1* | 3/2018 | Glaser | H04R 29/005 |
| 2020/0317054 A1* | 10/2020 | Nara | G01C 21/3697 |
| 2021/0208745 A1* | 7/2021 | Tuzar | G06F 3/04847 |
| 2021/0327396 A1* | 10/2021 | Ohtake | B60K 35/231 |
| 2021/0364281 A1* | 11/2021 | Petill | H04R 3/005 |
| 2023/0074274 A1* | 3/2023 | Kim | G10K 11/178 |
| 2023/0086518 A1* | 3/2023 | Marissen | G06F 16/686 705/26.7 |
| 2024/0394960 A1* | 11/2024 | Byrod | G06T 19/003 |
| 2025/0003191 A1* | 1/2025 | Onodera | E02F 9/261 |
| 2025/0006051 A1* | 1/2025 | Cohen | G08G 1/0967 |
| 2025/0164275 A1* | 5/2025 | Tulit | G06F 3/0484 |

FOREIGN PATENT DOCUMENTS

| | | |
|---|---|---|
| JP | 2007225383 A | 9/2007 |
| KR | 200467677 Y1 | 6/2013 |

* cited by examiner

Primary Examiner — Tuyetlien T Tran
(74) Attorney, Agent, or Firm — Jordan IP Law, LLC

(57) ABSTRACT

Systems, apparatuses, and methods provide for musical processing for vehicle mapping systems. audio data to be played is obtained. A plurality of features are identified in a map currently presented on a display of a vehicle. The audio data is played. A display is changed of at least one of the plurality of features in the map based on the play of the audio data.

20 Claims, 6 Drawing Sheets

MUSIC PROCESSING FOR VEHICLE MAPS

TECHNICAL FIELD

Embodiments generally relate to vehicle mapping systems. More particularly, embodiments relate to musical processing for vehicle mapping systems.

BACKGROUND

Drivers often may be assisted by vehicle navigation applications. These vehicle navigation applications often display a map illustrating the area around a driver's current location.

BRIEF DESCRIPTION OF THE DRAWINGS

Various examples will be described below by referencing the following drawings, in which.

DETAILED DESCRIPTION

Figure 1:
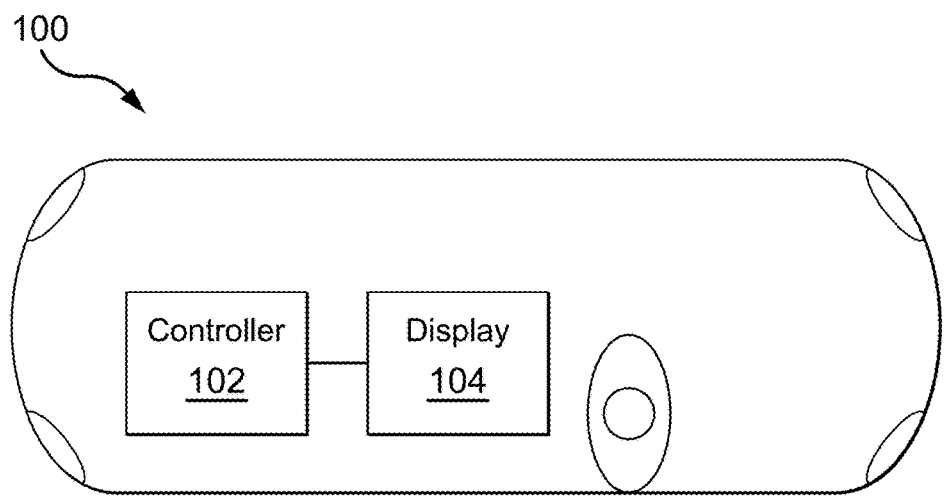
FIG. 1 is a diagram illustrating a vehicle according to an example.

FIG. 1 is a diagram illustrating a vehicle 100 according to an example. As illustrated, vehicle 100 is an automobile. In other examples, vehicle 100 may be a car, taxi, shuttle, truck, van, sport utility vehicle/SUV, motorcycle, an electronic bicycle, an aircraft, the like, and/or combinations thereof.

In an example, the vehicle 100 includes a controller 102 coupled to a display 104. The display 104 presents a vehicle navigation application including a map illustrating the area around a driver's current location.

In the illustrated implementation, controller 102 may be any type of vehicle-installed, handheld, desktop, or other form of single computing device, or may be composed of multiple computing devices. For example, controller 102 may include one or more processor(s), such as a central processing unit and/or any other type of similar device, or multiple devices, capable of manipulating or processing information. Controller 102 may include a memory, such as a random access memory device (RAM) or any other suitable type of storage device.

As will be discussed in greater detail below, at least one of the plurality of features in the map may be highlighted based on audio data. For example, the plurality of features may include an interstate roadway, a highway roadway, a residential roadway, a land area, a water area, a vehicle position indicator, the like, and/or combinations thereof.

For example, some portions of the audio data may be associated with a particular one of the plurality of features (e.g., a land area) highlighted in a first color (e.g., green or the like), while other portions of the audio data may be associated with a different one of the plurality of features (e.g., an interstate roadway) highlighted in a different second color (e.g., red or the like).

In some implementations, a first road class is associated with a first sound wave amplitude in the audio data and a second road class is associated with a second sound wave amplitude in the audio data. In such an example, the change of the display of the at least one of the plurality of features in the map includes highlighting the first road class in response to the first sound wave amplitude and highlighting the second road class in response to the second sound wave amplitude.

Alternatively, a first road class is associated with a first track in the audio data and a second road class is associated with a second track in the audio data. In such an example, the change of the display of the at least one of the plurality of features in the map includes highlighting the first road class in response to the first track and highlighting the second road class in response to the second track. For example, a first track might be to a particular instrument and/or voice, while the second track might be to a different instrument and/or voice in the audio data.

Figure 2:
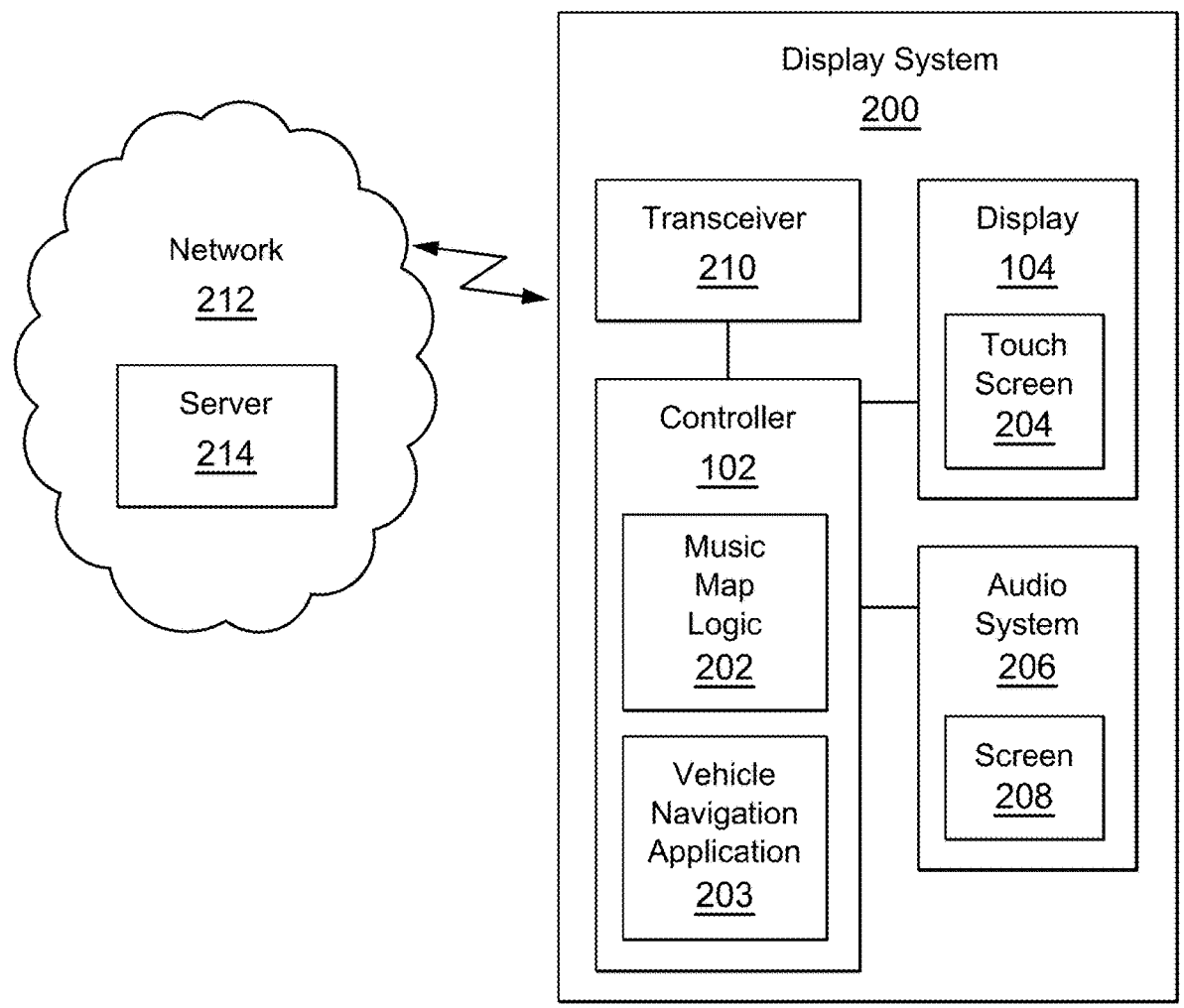
FIG. 2 is a diagram illustrating a display system according to an example.

FIG. 2 is a diagram illustrating a display system 200 according to an example. As illustrated, a portion of a vehicle (e.g., car, taxi, shuttle, truck, van, sport utility vehicle/SUV, aircraft, etc.) may include a musical map display system 200.

In some implementations, display system 200 communicates with a server 214 over network 212 via transceiver 210 (e.g., a transmitter and receiver pair of a wireless communications device) to receive audio data including mapping instructions. As will be discussed in greater detail below, the mapping instructions are utilized via to highlight various features in the map in response to the audio data.

For example, display system 200 includes a display 104 and an audio system 206 in communication with a controller 102. Controller 102 receives audio data including mapping instructions from the server 214 via the transceiver 210. A vehicle navigation application 203 presents a map to a user via the touch screen 204 of display 104.

A music map logic 202 receives map data based on what is being presented to the user from the vehicle navigation application 203 and receives the audio data including mapping instructions. The music map logic 202 associates features from the map data to portions of the audio data based on the mapping instructions. The music map logic 202 then plays the audio data via speaker 208 of the audio system 206. Simultaneously, the music map logic 202 highlights a particular one of the plurality of features (e.g., a land area) in a first color (e.g., green or the like) and highlights a different one of the plurality of features (e.g., an interstate roadway) in a different second color (e.g., red or the like) in response to the audio data.

Figure 3:
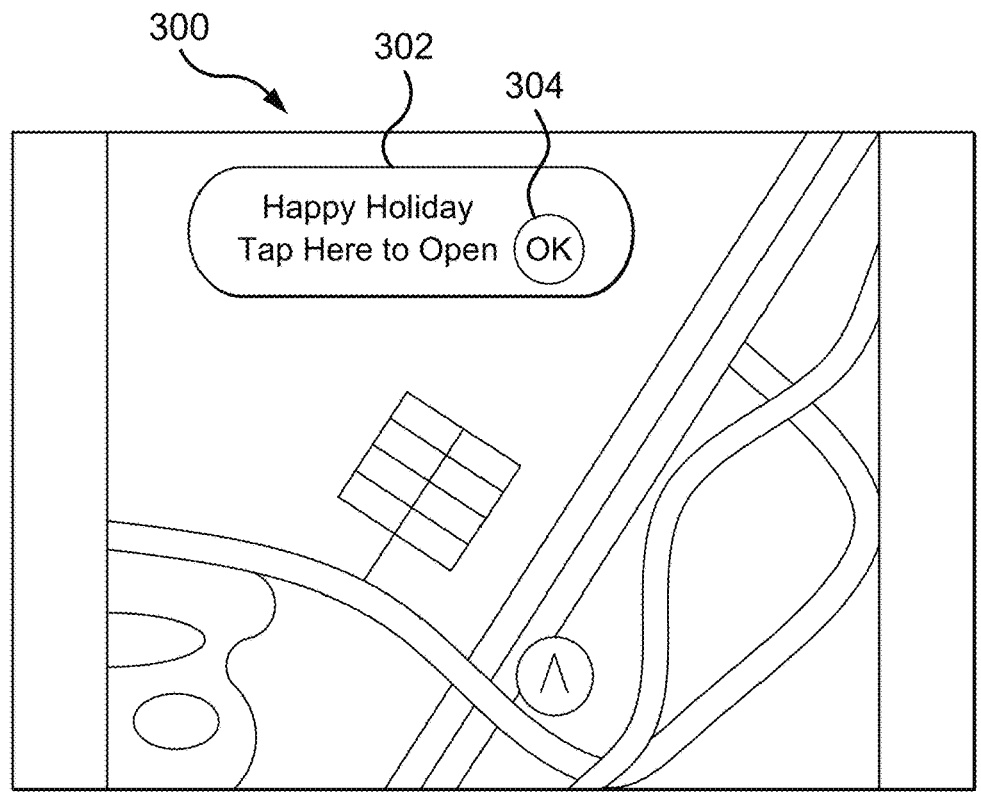
FIG. 3 is a diagram illustrating a map according to an example.

FIG. 3 is a diagram illustrating a musically highlighted map 300 according to an example. As illustrated, a message 302 may be presented on the display to a user presenting an option 304 to activate the audio data and associated mapping instructions.

In some implementations, the message will include a button (e.g., an "OK," "yes," the like, and/or combinations thereof) on the user interface presented on the display for selection by a user to activate the music map features.

Figure 4:
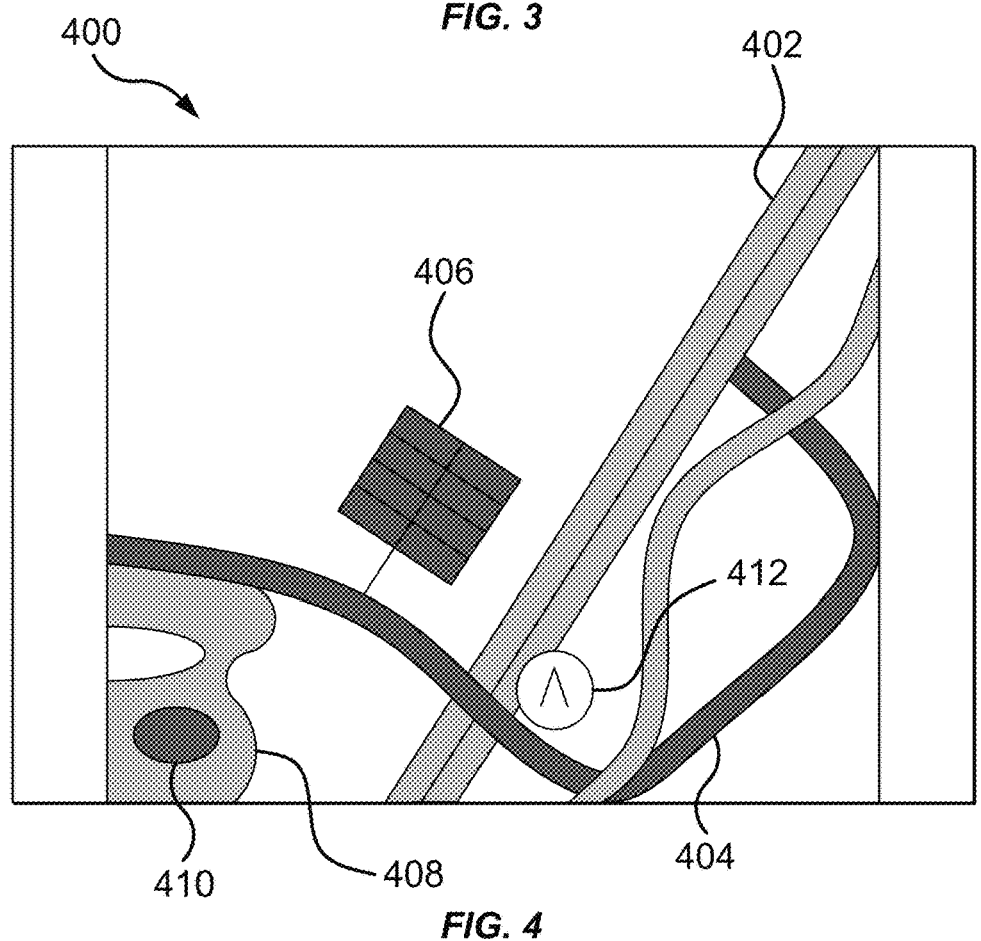
FIG. 4 is a diagram illustrating a musically highlighted map according to an example.

FIG. 4 is a diagram illustrating a musically highlighted map 400 according to an example. As will be described below in greater detail, at least one of the plurality of features 402-412 in the map 400 may be highlighted based on audio data. For example, the plurality of features may include an interstate roadway 402, a highway roadway 404, a residential roadway 406, a land area 410, a water area 412, a vehicle position indicator 412, the like, and/or combinations thereof.

For example, some portions of the audio data may be associated with a particular one of the plurality of features (e.g., a land area 410) highlighted in a first color (e.g., green or the like, illustrated here in light grey shading), while other portions of the audio data may be associated with a different one of the plurality of features (e.g., an interstate roadway 402) highlighted in a different second color (e.g., red or the like, illustrated here in dark grey shading).

In some examples, the highlighting the at least one of the plurality of features in the map pulsates in response to a beat in the audio data.

In some implementations, the highlighting the at least one of the plurality of features in the map changes in intensity in response to a sound wave amplitude in the audio data. In another example, the highlighting the at least one of the plurality of features in the map changes in intensity in response to a sound wave length associated with a first amplitude in the audio data.

Figure 5:
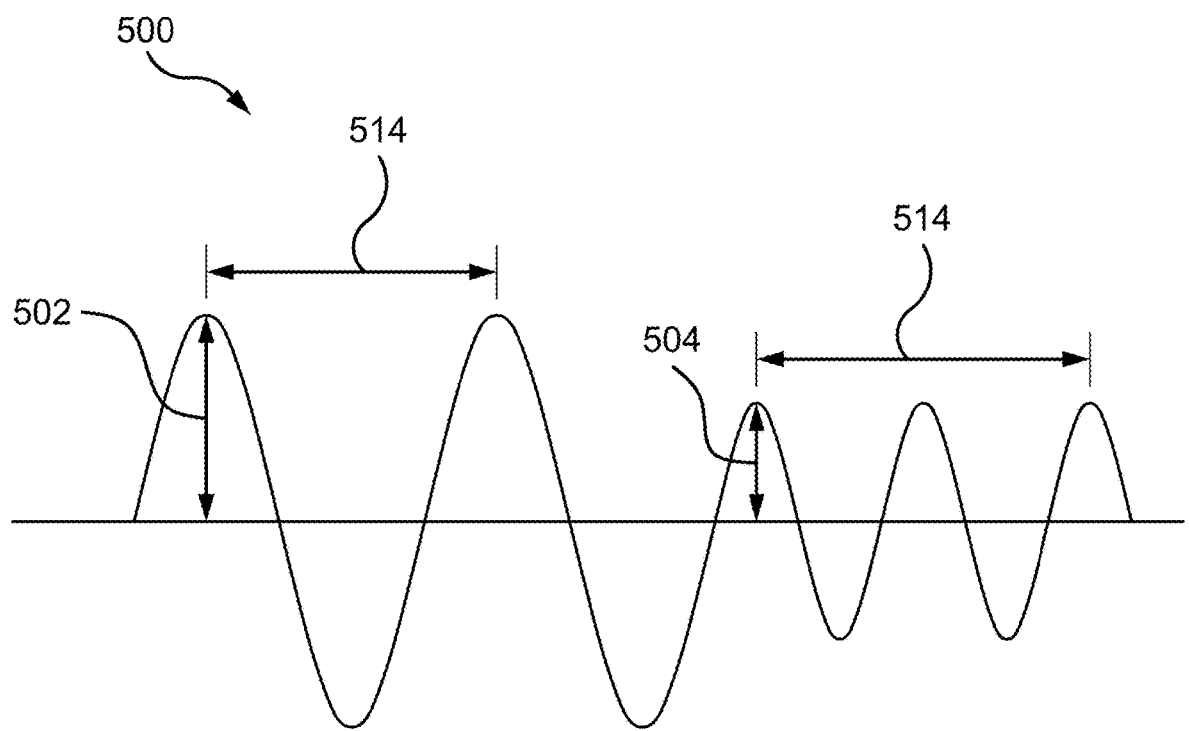
FIG. 5 is a diagram illustrating a sound wave according to an example.

FIG. 5 shows an example audio data sound wave 500. The sound wave 500 is illustrated as having a first sound wave amplitude 502 occurring for a first sound wave length 512 and a second sound wave amplitude 504 occurring for a second sound wave length 514.

As will be described in greater detail below, procedures herein provide for changing a display of at least one of the plurality of features in the map based on the play of the audio data. For example, the change of the display of the at least one of the plurality of features in the map includes highlighting the at least one of the plurality of features in the map.

In some implementations, a first road class is associated with a first sound wave amplitude 502 in the audio data and a second road class is associated with a second sound wave amplitude 504 in the audio data. In such an example, the change of the display of the at least one of the plurality of features in the map includes highlighting the first road class in response to the first sound wave amplitude 502 and highlighting the second road class in response to the second sound wave amplitude 504.

Alternatively, a first road class is associated with a first track in the audio data and a second road class is associated with a second track in the audio data. In such an example, the change of the display of the at least one of the plurality of features in the map includes highlighting the first road class in response to the first track and highlighting the second road class in response to the second track. For example, a first track might be to a particular instrument and/or voice, while the second track might be to a different instrument and/or voice in the audio data.

Figure 6:
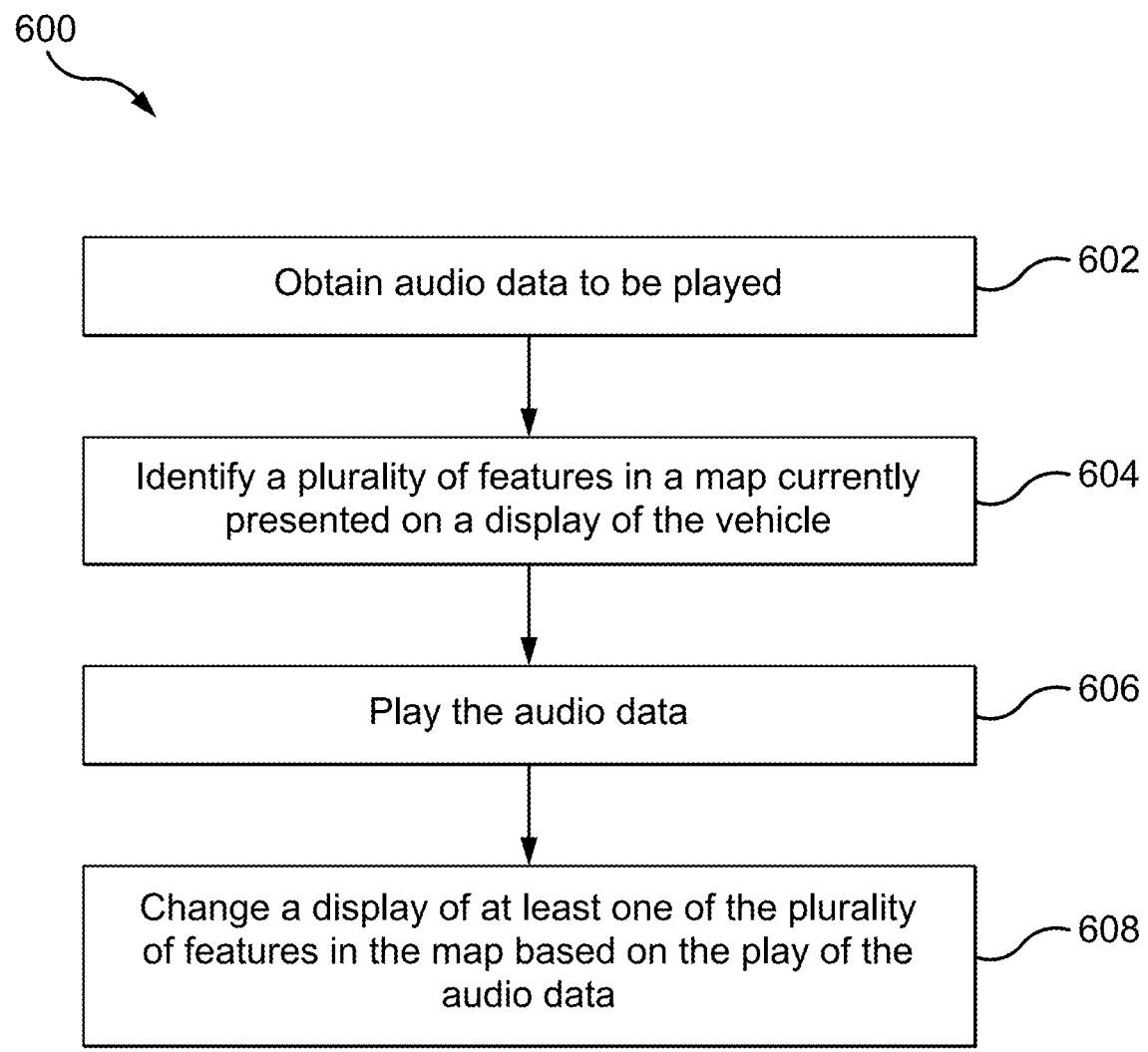
FIG. 6 is an illustration of a flowchart of an example method for musical processing for vehicle mapping systems according to an example.

FIG. 6 shows an example method 600 for musical processing for vehicle mapping systems according to an example. The method 600 may generally be implemented in an apparatus, such as, for example, the vehicle 100 (FIG. 1) and/or the display system 200 (FIG. 2), already discussed.

Illustrated processing block 602 provides for obtaining audio data to be played. For example, such audio date may be obtained from a sever via a network.

In some implementations, the audio data includes mapping instructions, where the mapping instructions associate a plurality of features in the audio data to the plurality of features in the map. For example, the plurality of features may include an interstate roadway, a highway roadway, a residential roadway, a land area, a water area, a vehicle position indicator, the like, and/or combinations thereof. In such an example, some portions of the audio data may be associated with a particular one of the plurality of features (e.g., a land area). Other portions of the audio data may be associated with a different one of the plurality of features (e.g., an interstate roadway).

Illustrated processing block 604 provides for identifying a plurality of features in a map currently presented on a display of a vehicle. For example, the plurality of features may include an interstate roadway, a highway roadway, a residential roadway, a land area, a water area, a vehicle position indicator, the like, and/or combinations thereof.

Illustrated processing block 606 provides for playing the audio data.

Illustrated processing block 608 provides for changing a display of at least one of the plurality of features in the map based on the play of the audio data. For example, the change of the display of the at least one of the plurality of features in the map includes highlighting the at least one of the plurality of features in the map.

In an example, the method 600 may be implemented in computer readable instructions (e.g., software), configurable computer readable instructions (e.g., firmware), fixed-functionality computer readable instructions (e.g., hardware), etc., or any combination thereof.

In some examples, it will be appreciated that some or all of the operations in method 600 may be performed at least in part by cloud processing.

It will be appreciated that some or all of the operations in method 600 are described using a "pull" architecture (e.g., polling for new information followed by a corresponding response) may instead be implemented using a "push" architecture (e.g., sending such information when there is new information to report), and vice versa.

Additional details regarding method 600 are detailed below in FIG. 7.

Figure 7:
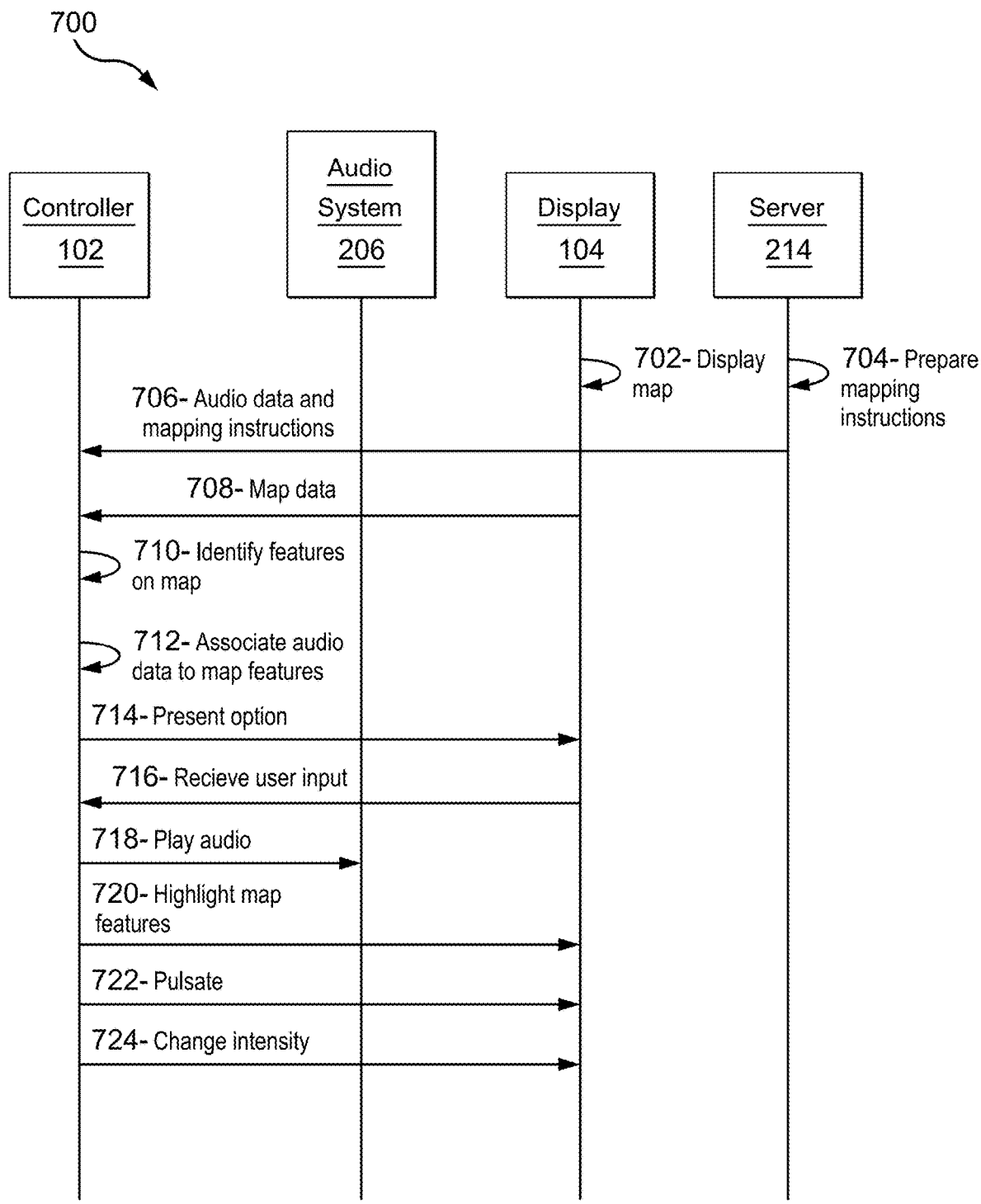
FIG. 7 is another illustration of a flowchart of an example method for musical processing for vehicle mapping systems according to an example.

FIG. 7 shows another example method 700 for musical processing for vehicle mapping systems according to an example. The method 700 may generally be implemented in an apparatus, such as, for example, the vehicle 100 (FIG. 1) and/or the display system 200 (FIG. 2), already discussed.

Illustrated processing block 702 provides for displaying a map. For example, a map may be displayed via display 104. In such an example, the display 104 presents a vehicle navigation application including a map illustrating the area around a driver's current location.

Illustrated processing block 704 provides for preparing mapping instructions. For example, such mapping instructions are based on audio data.

In some implementations, the mapping instructions associate a plurality of features in the audio data to the plurality of features in the map. For example, the plurality of features may include an interstate roadway, a highway roadway, a residential roadway, a land area, a water area, a vehicle position indicator, the like, and/or combinations thereof. In such an example, some portions of the audio data may be associated with a particular one of the plurality of features (e.g., a land area). Other portions of the audio data may be associated with a different one of the plurality of features (e.g., an interstate roadway).

Illustrated processing block 706 provides for obtaining audio data to be played and mapping instructions. For example, such audio date may be obtained from a sever 214 via a network.

Illustrated processing block 708 provides for obtaining map data. For example, map data may be obtained from the display 104 and/or the associated controller.

Illustrated processing block 710 provides for identifying a plurality of features in a map currently presented on a display of a vehicle. For example, the plurality of features may include an interstate roadway, a highway roadway, a residential roadway, a land area, a water area, a vehicle position indicator, the like, and/or combinations thereof.

For example, the plurality of features may include an interstate roadway, a highway roadway, a residential roadway, a land area, a water area, a vehicle position indicator, the like, and/or combinations thereof.

Illustrated processing block 712 provides for associating audio data to map features. For example, the audio data is associated to the map features based on the mapping instructions received from server 214.

In some implementations, the mapping instructions associate a plurality of features in the audio data to the plurality of features in the map. In such an example, some portions of the audio data may be associated with a particular one of the plurality of features (e.g., a land area). Other portions of the audio data may be associated with a different one of the plurality of features (e.g., an interstate roadway).

Illustrated processing block 714 provides for presenting an option to activate the audio data and associated mapping instructions. For example, a message may be presented on the display 104 to a user presenting an option activate the audio data and associated mapping instructions.

In some implementations, the message will include a button (e.g., an "OK," "yes," the like, and/or combinations thereof) on the user interface presented on the display 104 for selection by a user.

Illustrated processing block 716 provides for receiving user input selecting the option to activate the audio data and associated mapping instructions. For example, the user input will be received that the user has selected the option to activate the audio data and associated mapping instructions (e.g., via the user pressing the button on the user interface presented on the display 104 for selection by a user).

Illustrated processing block 718 provides for playing the audio data. For example, the audio data will be played in response to receiving user input selecting the option to activate the audio data and associated mapping instructions.

Alternatively, the audio data may be played automatically in a default mode without the need for user input.

Illustrated processing blocks 720-724 provides for changing a display of at least one of the plurality of features in the map based on the play of the audio data. For example, the change of the display of the at least one of the plurality of features in the map includes highlighting the at least one of the plurality of features in the map.

In some implementations, a first road class is associated with a first sound wave amplitude in the audio data and a second road class is associated with a second sound wave amplitude in the audio data. In such an example, the change of the display of the at least one of the plurality of features in the map includes highlighting the first road class in response to the first sound wave amplitude and highlighting the second road class in response to the second sound wave amplitude.

In some examples, a first road class is associated with a first track in the audio data and a second road class is associated with a second track in the audio data. In such an example, the change of the display of the at least one of the plurality of features in the map includes highlighting the first road class in response to the first track and highlighting the second road class in response to the second track. For example, a first track might be to a particular instrument and/or voice, while the second track might be to a different instrument and/or voice in the audio data.

Illustrated processing block 720 provides for highlighting the at least one of the plurality of features in the map. For example, some portions of the audio data may be associated with a particular one of the plurality of features (e.g., a land area) highlighted in a first color, while other portions of the audio data may be associated with a different one of the plurality of features (e.g., an interstate roadway) highlighted in a different second color.

Illustrated processing block 722 provides for pulsating the map features. For example, the highlighting the at least one of the plurality of features in the map pulsates in response to a beat in the audio data.

Illustrated processing block 724 provides for changing intensity of the map features. For example, the highlighting the at least one of the plurality of features in the map changes in intensity in response to a sound wave amplitude in the audio data. In another example, the highlighting the at least one of the plurality of features in the map changes in intensity in response to a sound wave length associated with a first amplitude in the audio data.

Figure 8:
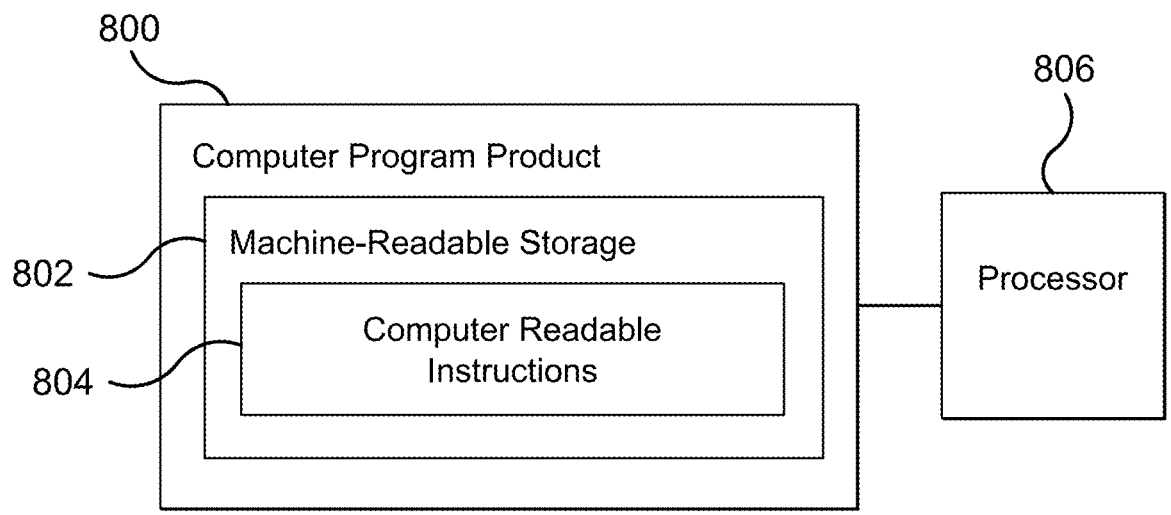
FIG. 8 is a block diagram illustrating a computer program product according to an example.

FIG. 8 illustrates a block diagram of an example computer program product 800. In some examples, as shown in FIG. 8, computer program product 800 includes a machine-readable storage 802 that may also include computer readable instructions 804. In some implementations, the machine-readable storage 802 may be implemented as a non-transitory machine-readable storage. In some implementations the computer readable instructions 804, which may be implemented as software, for example. In an example, the computer readable instructions 804, when executed by a processor 806, implement one or more aspects of the method 600 (FIG. 6), the method 700 (FIG. 7), and/or the display system 200 (FIG. 2), already discussed.

Figure 9:
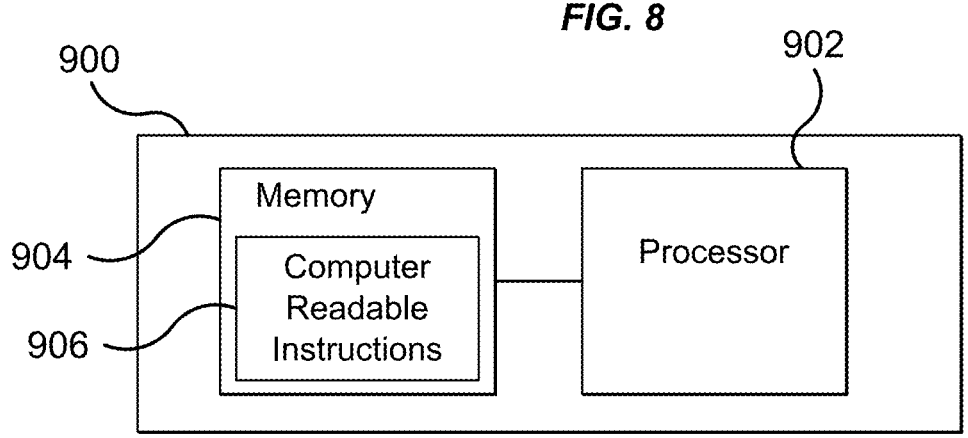
FIG. 9 is a block diagram illustrating an example fluid delivery apparatus according to an example.

FIG. 9 shows an illustrative example of a computer 900. In the illustrated example, the computer 900 may include a processor 902 and a memory 904 communicatively coupled to the processor 902. The memory 904 may include computer readable instructions 906, which may be implemented as software, for example. In an example, the computer readable instructions 906, when executed by the processor 902, implement one or more aspects of the method 600 (FIG. 6), the method 700 (FIG. 7), and/or the display system 200 (FIG. 2), already discussed.

In some implementations, the processor 902 may include a general purpose controller, a special purpose controller, a storage controller, a storage manager, a memory controller, a micro-controller, a general purpose processor, a special purpose processor, a central processor unit (CPU), the like, and/or combinations thereof.

Further, implementations may include distributed processing, component/object distributed processing, parallel processing, the like, and/or combinations thereof. For example, virtual computer system processing may implement one or more of the methods or functionalities as described herein, and the processor 902 described herein may be used to support such virtual processing.

In some examples, the memory 904 is an example of a computer-readable storage medium. For example, memory 904 may be any memory which is accessible to the processor 902, including, but not limited to RAM memory, registers, and register files, the like, and/or combinations thereof. References to "computer memory" or "memory" should be interpreted as possibly being multiple memories. The memory may for instance be multiple memories within the same computer system. The memory may also be multiple memories distributed amongst multiple computer systems or computing devices.

Figure 10:
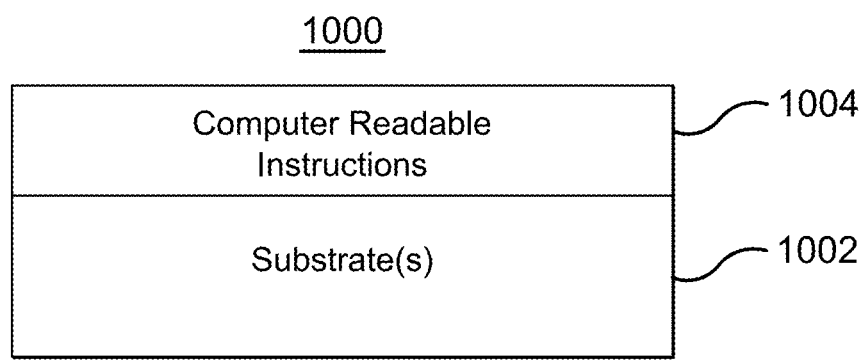
FIG. 10 is a block diagram illustrating a hardware apparatus including a semiconductor package according to an example.

FIG. 10 shows an illustrative semiconductor apparatus 1000 (e.g., chip and/or package). The illustrated apparatus 1000 includes one or more substrates 1002 (e.g., silicon, sapphire, or gallium arsenide) and computer readable instructions 1004 (such as, configurable computer readable instructions (e.g., firmware) and/or fixed-functionality computer readable instructions (e.g., hardware)) coupled to the substrate(s) 1002. In an example, the computer readable instructions 1004 implement one or more aspects of the method 600 (FIG. 6), the method 700 (FIG. 7), and/or the display system 200 (FIG. 2), already discussed.

In some implementations, computer readable instructions 1004 may include transistor array and/or other integrated circuit/IC components. For example, configurable firmware logic and/or fixed-functionality hardware logic implementations of the computer readable instructions 1004 may include configurable computer readable instructions such as, for example, programmable logic arrays (PLAs), field programmable gate arrays (FPGAs), complex programmable logic devices (CPLDs), or fixed-functionality computer readable instructions (e.g., hardware) using circuit technology such as, for example, application specific integrated circuit (ASIC), complementary metal oxide semiconductor (CMOS) or transistor-transistor logic (TTL) technology, the like, and/or combinations thereof.

All definitions, as defined and used herein, should be understood to control over dictionary definitions, definitions in documents incorporated by reference, and/or ordinary meanings of the defined terms.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc.

The terms "coupled," "attached," or "connected" may be used herein to refer to any type of relationship, direct or indirect, between the components in question, and may apply to electrical, mechanical, fluid, optical, electromagnetic, electro-mechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Although a number of illustrative examples are described herein, it should be understood that numerous other modifications and examples can be devised by those skilled in the art that will fall within the spirit and scope of the principles of the foregoing disclosure. More particularly, reasonable variations and modifications are possible in the component parts and/or arrangements of the subject combination arrangement within the scope of the foregoing disclosure, the drawings and the appended claims without departing from the spirit of the foregoing disclosure. In addition to variations and modifications in the component parts and/or arrangements, alternative uses will also be apparent to those skilled in the art. The examples may be combined to form additional examples.

I claim:

1. A vehicle comprising:
a processor; and
a memory communicatively coupled to the processor, the memory storing logic that includes a set of instructions executable by the processor, which when executed by the processor, cause the processor to:
obtain audio data to be played;
identify a plurality of features in a map currently presented on a display of the vehicle;
associate a first road class with a first aspect of the audio data and a second road class with a second aspect of the audio data;
play the audio data; and
change a display of at least one of the plurality of features in the map based on the play of the audio data, wherein the change of the display of the at least one of the plurality of features in the map comprises highlighting the first road class in response to the first aspect of the audio data and highlighting the second road class in response to the second aspect of the audio data.

2. The vehicle of claim 1, wherein the audio data includes mapping instructions, wherein the mapping instructions associate a plurality of features in the audio data to the plurality of features in the map.

3. The vehicle of claim 1, wherein the change of the display of the at least one of the plurality of features in the map comprises highlighting the at least one of the plurality of features in the map.

4. The vehicle of claim 3, wherein the highlighting the at least one of the plurality of features in the map pulsates in response to a beat in the audio data.

5. The vehicle of claim 3, wherein the highlighting the at least one of the plurality of features in the map changes in intensity in response to a sound wave amplitude in the audio data.

6. The vehicle of claim 3, wherein the highlighting the at least one of the plurality of features in the map changes in intensity in response to a sound wave length associated with a first amplitude in the audio data.

7. The vehicle of claim 1, further comprising:
associate the first road class with a first sound wave amplitude in the audio data and the second road class with a second sound wave amplitude in the audio data, and
wherein the change of the display of the at least one of the plurality of features in the map comprises highlighting the first road class in response to the first sound wave amplitude and highlighting the second road class in response to the second sound wave amplitude.

8. The vehicle of claim 1, further comprising:
associate the first road class with a first track in the audio data and the second road class with a second track in the audio data, and
wherein the change of the display of the at least one of the plurality of features in the map comprises highlighting the first road class in response to the first track and highlighting the second road class in response to the second track.

9. The vehicle of claim 8, wherein the first and second road class comprise one or more of an interstate roadway, a highway roadway, a residential roadway, a land area, a water area, or a vehicle position indicator.

10. At least one non-transitory machine-readable storage, comprising a set of instructions, which when executed by a computing device, cause the computing device to:
obtain audio data to be played;
identify a plurality of features in a map currently presented on a display of a vehicle;
associate a first road class with a first aspect of the audio data and a second road class with a second aspect of the audio data;
play the audio data; and
change a display of at least one of the plurality of features in the map based on the play of the audio data, wherein the change of the display of the at least one of the plurality of features in the map comprises highlighting the first road class in response to the first aspect of the audio data and highlighting the second road class in response to the second aspect of the audio data.

11. The at least one non-transitory machine-readable storage of claim 10, wherein the audio data includes mapping instructions, wherein the mapping instructions associate a plurality of features in the audio data to the plurality of features in the map.

12. The at least one non-transitory machine-readable storage of claim 10, wherein the change of the display of the at least one of the plurality of features in the map comprises highlighting the at least one of the plurality of features in the map.

13. The at least one non-transitory machine-readable storage of claim 12, wherein the highlighting the at least one of the plurality of features in the map pulsates in response to a beat in the audio data.

14. The at least one non-transitory machine-readable storage of claim 12, wherein the highlighting the at least one of the plurality of features in the map changes in intensity in response to a sound wave amplitude in the audio data.

15. The at least one non-transitory machine-readable storage of claim 12, wherein the highlighting the at least one of the plurality of features in the map changes in intensity in response to a sound wave length associated with a first amplitude in the audio data.

16. The at least one non-transitory machine-readable storage of claim 10, wherein the set of instructions further cause the computing device to:
associate the first road class with a first sound wave amplitude in the audio data and the second road class with a second sound wave amplitude in the audio data, and
wherein the change of the display of the at least one of the plurality of features in the map comprises highlighting the first road class in response to the first sound wave amplitude and highlighting the second road class in response to the second sound wave amplitude.

17. The at least one non-transitory machine-readable storage of claim 10, wherein the set of instructions further cause the computing device to:
associate the first road class with a first track in the audio data and the second road class with a second track in the audio data, and
wherein the change of the display of the at least one of the plurality of features in the map comprises highlighting the first road class in response to the first track and highlighting the second road class in response to the second track.

18. A method comprising:
obtaining audio data to be played;
identifying a plurality of features in a map currently presented on a display of a vehicle;
associating a first road class with a first aspect of the audio data and a second road class with a second aspect of the audio data;
playing the audio data; and
changing a display of at least one of the plurality of features in the map based on the play of the audio data, wherein the change of the display of the at least one of the plurality of features in the map comprises highlighting the first road class in response to the first aspect of the audio data and highlighting the second road class in response to the second aspect of the audio data.

19. The method of claim 18, wherein the audio data includes mapping instructions, wherein the mapping instructions associate a plurality of features in the audio data to the plurality of features in the map.

20. The method of claim 18, wherein the change of the display of the at least one of the plurality of features in the map comprises highlighting the at least one of the plurality of features in the map.

* * * * *